United States Patent [19]

Fischer

[11] Patent Number: 4,904,134
[45] Date of Patent: Feb. 27, 1990

[54] SPREADING PLUG FOR ANCHORING IN UNDERCUT BOREHOLES

[75] Inventor: Artur Fischer, Waldachtal, Fed. Rep. of Germany

[73] Assignee: fischerwerke Artur Fischer GmbH & Co. KG, Tumlingen/Waldachtal, Fed. Rep. of Germany

[21] Appl. No.: 268,293

[22] Filed: Nov. 7, 1988

[30] Foreign Application Priority Data

Nov. 5, 1987 [DE] Fed. Rep. of Germany ....... 3737549

[51] Int. Cl.⁴ ............................................. F16B 13/06
[52] U.S. Cl. ........................................ 411/54; 411/55; 411/60
[58] Field of Search .............. 411/29, 54, 55, 57, 411/60, 61, 65, 66

[56] References Cited

U.S. PATENT DOCUMENTS

| | | | |
|---|---|---|---|
| 1,379,209 | 5/1921 | Phillips | 411/29 |
| 4,026,186 | 5/1977 | Williams, Jr. et al. | 411/29 |
| 4,560,311 | 12/1985 | Herb et al. | 411/54 |
| 4,636,122 | 1/1987 | Rooney | 411/54 |

FOREIGN PATENT DOCUMENTS

| | | | |
|---|---|---|---|
| 280834 | 12/1964 | Australia | 411/29 |
| 2745805 | 4/1979 | Fed. Rep. of Germany | 411/29 |

*Primary Examiner*—Neill R. Wilson
*Attorney, Agent, or Firm*—Michael J. Striker

[57] ABSTRACT

A spreading plug for anchoring in undercut boreholes comprises a plug shaft, a spreading body connected with the plug shaft, a thread connecting the spreading body with the plug shaft, a plurality of spreading segments which are spreadable over the spreading body, the spreading body having an end side, a safety element projecting from the end side of the spreading body for preventing rotation, the spreading segments being formed on the plug shaft and extending in direction toward the spreading body, the plug shaft having a mounting part facing away of the spreading body, and an element for cooperating with a rotary tool and provided on the mounting part of the plug shaft.

10 Claims, 1 Drawing Sheet

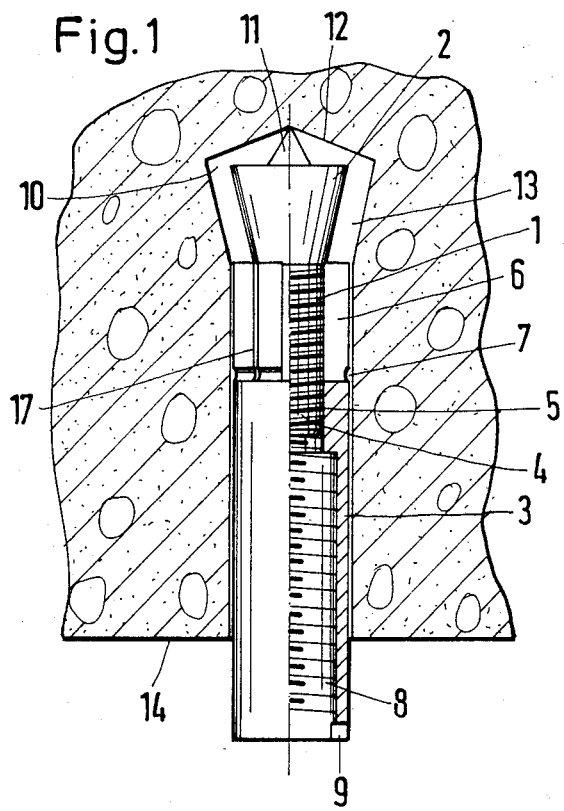
Fig. 1
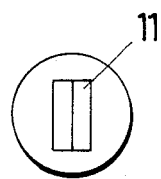
Fig. 2
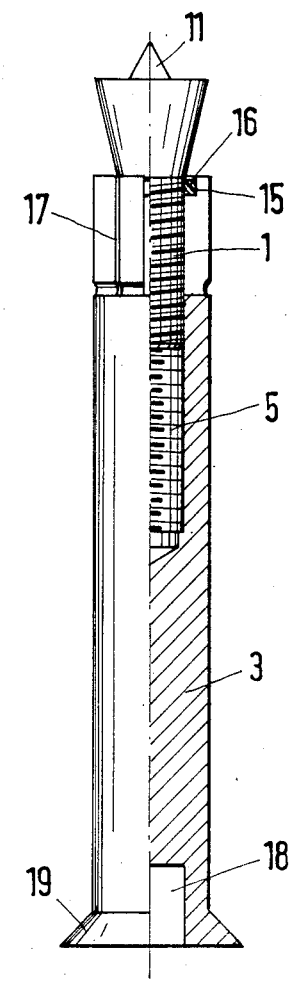
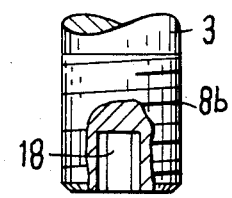
Fig. 4

{ 4,904,134 }

SPREADING PLUG FOR ANCHORING IN UNDERCUT BOREHOLES

BACKGROUND OF THE INVENTION

The present invention relates to a spreading plug for anchoring in undercut boreholes.

More particularly, it relates to such a spreading plug which has a spreading body connected with a plug shaft by a thread and arranged to spread apart spreading segments.

In conically expanded boreholes metallical spreading plugs can be anchored almost free of a spreading pressure. Because of the significant spreading of the spreading elements, a very high holding force is obtained. Known spreading plugs have a spreading cone and a spreading sleeve which is driven over the spreading cone with the use of suitable impact tool. The plug shaft extends with a threaded element or the like outwardly beyond the borehole and can be clamped by means of screw nut with an object to be mounted. The known spreading plugs which are insertable by means of an impact mounting into the borehole with a conical undercut requires special impact tools which can correspond to the diameter of the used spreading plug.

SUMMARY OF THE INVENTION

Accordingly, it is an object of the present invention to provide a spreading plug for anchoring in undercut boreholes, which avoids the disadvantages of the prior art.

More particularly, it is an object of the present invention to provide a spreading plug for anchoring in undercut boreholes, which has a simple construction and permits a simple mounting.

In keeping with these objects and with others which will become apparent hereinafter, one feature of the present invention resides, briefly stated, in a spreading plug in which a safety element for preventing rotation is arranged on an end side of a spreading body, spreading segments are formed directly on a plug shaft and project in direction toward the spreading body, and the plug shaft on its mounting portion which faces away from the spreading body is provided with means for cooperating with a rotary tool.

By a combination of the rotary safety means, the spreading segments formed on the plug shaft, and the means for arranging a rotary tool, a spreading part which is composed only of two parts is formed. The insertion of the spreading plug into an undercut borehole is performed so that the spreading plug is first introduced up to the bottom of the borehole into the borehole, and the safety element of the spreading body abuts against the bottom of the borehole to prevent a rotation. Then a screwdriver or similar rotary tool is placed on the plug shaft and rotates, so that the plug shaft is screwed onto the thread of the spreading body and the spreading segments are spread apart on the spreading body.

In accordance with another feature of the present invention, the spreading body is advantageously formed as a threaded pin with a spreading cone, and a threaded portion is screwed through an annular space formed between the spreading segments coaxially in the plug shaft. For this purpose, the plug shaft is provided with an inner thread of a sufficient depth so as to permit a sufficient screwing-in of the threaded pin for obtaining a maximum spreading of the spreading segments.

For facilitating the spreading process, an outwardly extending annular groove is provided in the region of transition between the spreading segments and a remaining portion of the plug shaft, in accordance with still another feature of the present invention.

An especially good sliding condition is obtained between the spreading segments and the spreading body when in accordance with a further feature of the present invention a receptacle is formed on the inner surface of the spreading segments and filled with a sliding ring. The receptacle can be formed as a recess or an annular groove. The sliding ring can be composed of a material having high sliding properties, for example metal or synthetic plastic material.

The mounting part of the plug shaft can be provided with an inner thread or an outer thread for receiving respectively an outer thread or an inner thread of a rotary tool or fixing a mounting screw. Also, for engaging a rotary tool, an inner or outer hexagon or a slot can be used as well.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a spreading plug in accordance with the present invention, provided with an inner thread on a mounting part;

FIG. 2 is an end view of the spreading plug of FIG. 1 in accordance with the present invention; and FIG. 3 is a view showing a spreading plug in accordance with a second embodiment of the invention, with a sliding ring in the region of the spreading segments.

FIG. 4 shows a partial view of a plug shaft having a mounting portion with an outer thread.

DESCRIPTION OF THE PREFERRED EMBODIMENTS

An expansible plug shown in FIG. 1 has a threaded pin 1 with a spreading cone 2 and a plug shaft 3. The threaded pin 1 has a threaded portion 4, while the plug shaft 3 has an inner thread 5, so that the threaded pin 1 can be screwed in the plug shaft 3.

The plug shaft 3 at its end which faces toward the spreading cone 2 has a plurality of spreading segments 6 which are shaped on the plug shaft. They form a sleeve-shaped spreading region. An outer annular groove 7 is provided in the region between the spreading segments 6 and the plug shaft 3. The annular groove facilitates bending of the spreading segments 6 during a spreading process.

The plug shaft 3 is provided at its other end with an inner opening 8 and also with a transverse slot 9 for cooperating with a screwdriver.

When the mounting plug is located in the position shown in FIG. 1 inside a borehole 10, a rotary tool, for example a screwdriver, placed on the outwardly extending end of the plug shaft 3 and the latter is rotated. A safety element 11, which projects from an end side of the spreading cone 2 presses against a bottom 12 of the borehole 10. Thereby it is prevented that the threaded pin 1 corotates together with the plug shaft 3. By rotation on the plug shaft 3, it is screwed in direction toward the spreading cone 2. Thereby the spreading segments 6 are spread apart in an undercut 13 of the borehole 10.

After fixing the spreading plug, an object to be supported on a wall 14 is mounted by insertion of a screw into the inner thread 8 of the plug shaft 3.

As can be seen from the plan view of FIG. 2, the safety element 11 is formed as a wedge-shaped web. It is to be understood that the safety element can be somewhat different, for example it can be formed by distributor tips or the like.

FIG. 3 shows a spreading plug in accordance with another embodiment of the present invention. The parts of this plug which are similar to the parts of the plug shown in FIG. 1 are identified with the same reference numerals.

In the spreading plug shown in FIG. 3, a recess 15 is provided on the inner surface of the spreading segments 6. A sliding ring 16 is accommodated in the recess 15. The sliding ring 16 is composed of for example a synthetic plastic material. The segments 6 are also here formed on the shaft 3 and separated from one another by longitudinal slots 17.

The mounting part of the plug shaft 3 has an inner hexagon 18. A not shown rotary tool is insertable into the inner hexagon 18 for rotating the plug shaft 3. A flange 19 serves as a mounting element which permits clamping of a board, a frame or the like against a wall.

After spreading the spreading segments 6, the spreading plug in accordance with the present invention is reliably held in the borehole 10. A pulling force applied to the spreading plug is transmitted through the spreading segments 6 and the threaded pin 1 or through the threaded portion 4. Therefore, also in the region of the threaded portion 4 the whole cross-section of the spreading plug is effective for force transmission. Thereby extremely high load values cannot be reached.

It will be understood that each of the elements described above, or two or more together, may also find a useful application in other types of constructions differing from the types described above.

While the invention has been illustrated and described as embodied in a spreading plug for anchoring in undercut boreholes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A spreading plug for anchoring in an undercut borehole having a bottom, said spreading plug comprising a spreading body having an outer spreading surface and an end surface facing the bottom of the borehole; a plug shaft including a plurality of spreading segments extending in a direction toward said outer spreading surface and having inner surface means, said spreading segments being spreadable over said outer spreading surface upon axial displacement of said plug shaft relative to said spreading body; thread means connecting said spreading body and said plug shaft for enabling rotation of said plug shaft relative to said spreading body to provide for the axial displacement of said plug shaft relative to said spreading body, said plug shaft having a mounting portion facing away from said outer spreading surface and means provided on said mounting portion for cooperation with a rotary tool for rotating said plug shaft; a safety element projecting from said end surface of said spreading body for engaging the bottom of the borehole to prevent rotation of said spreading body upon rotation of said plug shaft; and means for facilitating displacement of said spreading segments over said outer spreading surface and comprising receptacle means formed in said inner surface means of said spreading means and sliding ring means arranged in said receptacle means for engaging said outer spreading surface and displacement thereover upon spreading of said spreading segments over said outer spreading surface.

2. A spreading plug as defined in claim 1, wherein said spreading segments are formed of one piece integrally with said plug shaft.

3. A spreading plug as defined in claim 1, wherein said spreading body is formed as a threaded pin which provided with a spreading cone defining said outer spreading surface, said threaded pin having a threaded potion, said spreading segments forming an annular space, said plug shaft being provided with an inner thread, said threaded portion of said threaded pin extending through said annular space formed by said spreading segments and engaging with said inner thread of said plug shaft.

4. A spreading plug as defined in claim 1, wherein said plug shaft is provided with an outer annular groove which is located in the region of a transition between said spreading segments and a remaining portion of said plug shaft.

5. A spreading plug as defined in claim 1, wherein said receptacle means is formed as a recess in said inner surface means of said segments.

6. A spreading plug as defined in claim 1, wherein said receptacle means is formed as an annular groove in said inner surface means of said segments.

7. A spreading plug as defined in claim 1, wherein said cooperation means on said mounting portion comprises a thread for cooperating with a threaded rotary tool, and for mounting a mounting screw.

8. A spreading plug as defined in claim 7, wherein said thread is formed as an inner thread.

9. A spreading plug as defined in claim 7, wherein said thread is formed as an outer thread.

10. A spreading plug as defined in claim 1, wherein said sliding ring means is composed of a material having high sliding properties.

* * * * *